Sept. 17, 1929.　　　C. H. RAMSEY　　　1,728,279
SPEED CHANGING UNIT
Filed Dec. 17, 1927
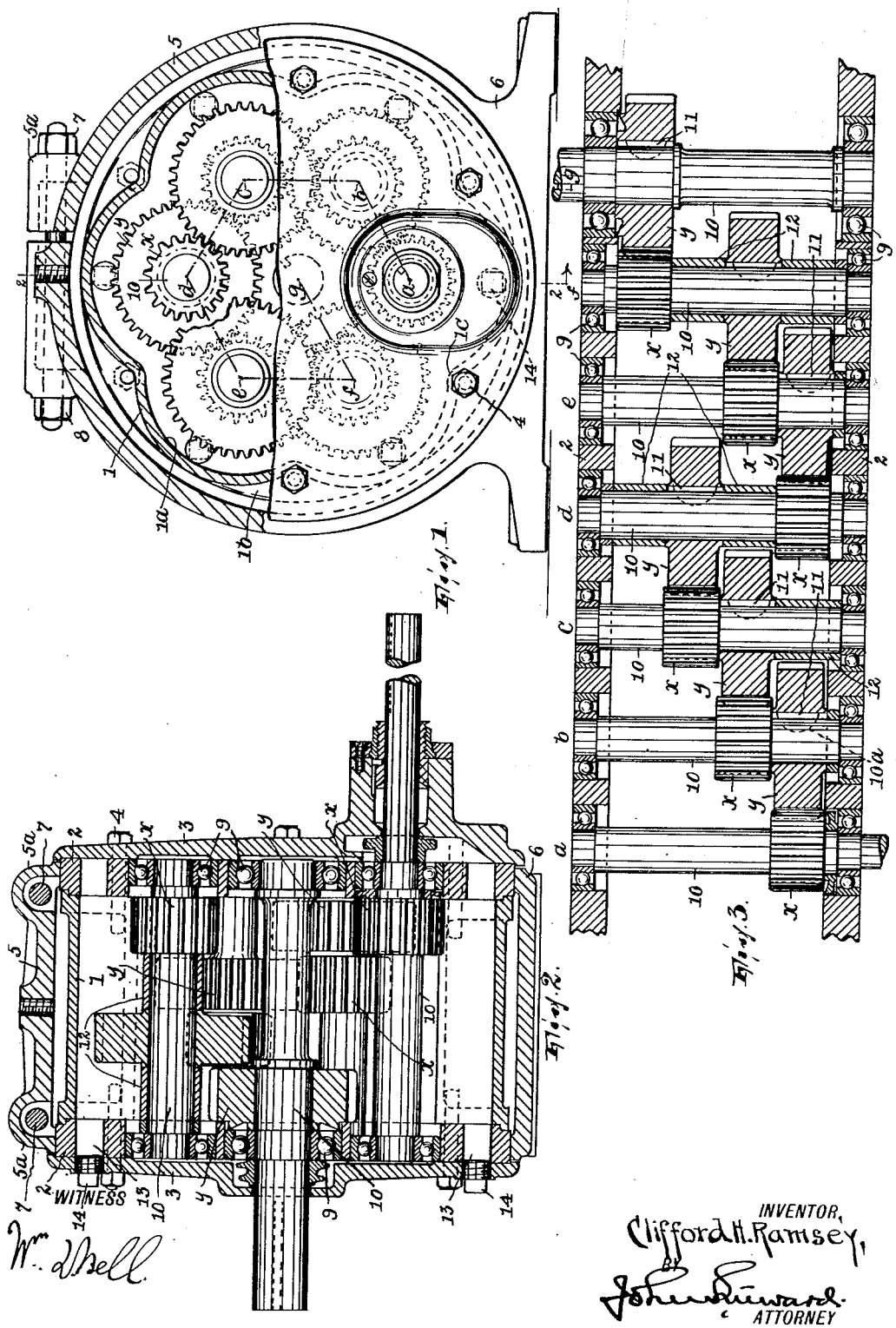
INVENTOR,
Clifford H. Ramsey,
ATTORNEY

UNITED STATES PATENT OFFICE

CLIFFORD H. RAMSEY, OF GLEN ROCK, NEW JERSEY

SPEED-CHANGING UNIT

Application filed December 17, 1927. Serial No. 240,706.

This invention relates to speed-changing units. Its principal object is to provide in a speed-changing unit for a considerable number of possible output speeds being derivable from but one intake speed and to accomplish this with the least number of gear-sizes in the transmission train, and also to provide a speed-changing unit which shall be at once symmetrical and quite compact in form.

In the drawing,

Fig. 1 is a front elevation of a speed-changing unit embodying the invention;

Fig. 2 is a section on line 2—2, Fig. 1; and

Fig. 3 is a sectional view showing a part of the unit as if it were developed to a plane, thus to facilitate an understanding of the mechanism, the section being assumed to be coincident with the broken line shown passing through the axis of the bearings $a$ to $g$ in Fig. 1.

It should be understood that the unit as specifically shown affords but one example of the invention.

A support is provided as follows: A generally annular shell 1 is abutted at its ends by the disks 2 outward of which are the heads 3 of somewhat greater diameter, each head and the shell being held in clamping relation to the interposed disk by screws 4; and embracing the structure thus formed is a split band 5 upstanding from a base 6 and having enlargements $5^a$ (divided by the split) receiving bolts 7 traversing the split and equipped with nuts 8, whereby said structure may be clamped in any position to which it is rotatively adjusted in the band—see my Patent No. 1,393,906. The shell is inwardly fluted, as at $1^a$ in Fig. 1, longitudinally of its axis (for a purpose to appear) but it has end exterior flanges $1^b$ and it is into these latter that the screws 4 take.

For the gear elements journaled therein this support has bearing centers arranged with one bearing center at $g$, serving also as a group center; and other bearing centers at $a$, $b$, $c$, $d$, $e$ and $f$ arranged as a series surrounding center $a$, the whole group of centers together forming the apices of six equilateral triangles composing a hexagon. With their axes coincident with these centers are the bearings 9 for the gear elements, such bearings being preferably arranged in pairs one in each disk 2, and here shown as ball bearings. Having such a support with bearing centers thus arranged there is not only symmetry and compactness of the entire organization but it is possible, with a given intake speed of the gear element chosen to serve as the intake element, to derive any one of a considerable number of output speeds, and yet a limited number (here only two) of diameters of gears proper have to be taken into account as potentially useful in the entire train of elements, thus:

According as a gear element is the intake or output element or one intermediate these two it will be provided with a gear proper $x$ of one diameter, a gear proper $y$ of another diameter, or gears proper of both these diameters, as shown. On account of the described arrangement of the centers the unit can be adapted to provide any of six different speed-changes with only these two sizes of gears proper available. Assume the user of the unit happens to require reduction, and reduction to the limit of the capacity of the unit, or 64–1, for which purpose the gear-ratio would be 2–1. Then a small gear proper of the gear element at center $a$ (here taken as the intake) meshes with a large gear proper of the gear element at center $b$; the small gear proper of the latter element meshes with the large gear proper of the gear element at center $c$; and so on to the large gear proper of the gear element at center $g$ (here taken as the output). But if the user required 32–1, or 16–1, or 8–1, or 4–1 or 2–1 it would only be a matter of preserving the continuity of the train through the several surrounding series of gear elements in the order of the centers $a$, $b$, $c$, etc. as far as the proper one of these centers, in some way leaving the remainder of such series out of commission, as by omitting them entirely. The invention is not particularly concerned with the details of the gear elements other than as stated, but in the last analysis it would probably be most practicable, as most simple and economical, for the producer of the units to keep in stock or otherwise prepared to provide himself with the following: Shafts 10 to be journaled in the bearings 9 and having the gears proper $x$ formed thereon at relatively four different stages lengthwise of the same and also having keyways 10$^a$; gears proper $y$ to be arranged on such shafts as the circumstances required and held from rotation relatively thereto by keys 11; and spacer sleeves 12 to be arranged on the shafts, where required, to maintain the gears proper $y$ at relatively four different stages lengthwise of the same; to afford the intake and output connections some of these shafts could be formed with prolongations, as those at the centers $a$ and $g$ in the illustrated example.

An important feature of the invention is the presence of a bearing center (as $g$), located centrally of all the others, serving for a gear element acting as one end gear element in the train. Thereby adjustment of the aforesaid structure housing the gear elements can be rotatively effected in the band 5 so as to alter the height of one end gear element in the train without altering the height of the other, which in many applications of the unit is desirable.

Where the centers $a$ to $f$ are as shown spaced apart the same distance as they are spaced from center $g$ (i. e., in the relation of the apices of six equilateral triangles arranged to form a hexagon) a further advantage lies in the fact that all the gears may have standard-pitch teeth. But so long as the spacings of the centers $a$ to $f$ are equal and their spacings from center $g$ are equal there will still be the other advantages herein named so far as the centers $a$ to $f$, at least, are concerned.

The housing forming by shell 1, disks 2 and heads 3 has a hole 13 therein through one head and disk inward of but close to the inner surface of shell 1 at the most outward or deepest point of each fluting 1$^a$, which is convex in cross-section; each such hole is provided with a screw-plug or other closure 14. Each hole, according to the position to which said housing or structure may be adjusted rotatively in the band 5, is adapted for introduction of a liquid lubricant and each also as a lubricant drain. The importance of the flutings, which incidentally strengthen the shell, is that, with the holes positioned relatively thereto as stated, even if the rotative position of the housing is such that the two lowest holes are more or less level the housing can be completely drained without leaving a residue whose level (without the intervening peak 1$^c$ which exists between two adjoining flutings) would be coincident with these holes, to wit, by removing both of their screw-plugs; in other words, the drawing off of all spent oil and all particles of metal etc. accumulating therein can always be completely effected.

The construction of the housing formed by shell 1, disks 2 and heads 3 is unique in this, that the ends of the shell are closed to provide for the containing of lubricant and for the support of the gear elements by what in effect are two removable endwalls (each comprising a disk and a head) each in effect having sockets, afforded by the bearings 9, in which the ends of the gear elements are fitted when the assembling is effected; I do not however wish to be limited to both of such walls being removable.

Having thus fully described my invention, what I claim is:

1. In combination, gearing, a lubricant housing containing the gearing and including a shell formed internally continuous around a substantially horizontal axis and means to close the ends of said shell, and means in which the housing is supported for relative adjustment around said axis, said shell being internally fluted lengthwise of said axis and around the same and the housing having drain holes and closures therefor and such holes leading from the housing in approximate coincidence with the deepest portions of the respective flutings.

2. A speed-changing unit comprising a shell formed continuous around a substantially horizontal axis and having an end wall closing one end thereof and provided with closed sockets and a removable end wall closing the other end thereof and comprising a head having openings therethrough opposite the sockets and a disk outward of the head and closing said openings and thereby forming of the latter other closed sockets, and intergeared gear-including elements having shaft portions and the ends of each shaft portion journaled within sockets of the two walls.

3. A speed-changing unit comprising a shell formed continuous around a substantially horizontal axis, end walls closing the ends of the shell and forming therewith a casing and having portions projecting outwardly beyond the periphery of the shell, intergeared gear-including elements journaled in said end walls within the casing, and means forming the sole support for the casing and in which said casing is adapted to be rotatively shifted around said axis including an annular structure encompassing the casing between said two portions.

In testimony whereof I affix my signature.

CLIFFORD H. RAMSEY.